(12) United States Patent
Feldman et al.

(10) Patent No.: US 10,365,849 B2
(45) Date of Patent: *Jul. 30, 2019

(54) DUAL GRANULARITY DYNAMIC MAPPING WITH PACKETIZED STORAGE

(71) Applicant: Seagate Technology LLC, Cupertino, CA (US)

(72) Inventors: Timothy Richard Feldman, Louisville, CO (US); Steven S. Williams, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/680,657

(22) Filed: Aug. 18, 2017

(65) Prior Publication Data

US 2019/0056881 A1 Feb. 21, 2019

(51) Int. Cl.
*H04L 29/06* (2006.01)
*G06F 3/06* (2006.01)

(52) U.S. Cl.
CPC ............ *G06F 3/0644* (2013.01); *G06F 3/061* (2013.01); *G06F 3/0604* (2013.01); *G06F 3/064* (2013.01); *G06F 3/0608* (2013.01); *G06F 3/0631* (2013.01); *G06F 3/0661* (2013.01); *G06F 3/0673* (2013.01); *G06F 3/0685* (2013.01)

(58) Field of Classification Search
CPC .... G06F 3/0644; G06F 3/0608; G06F 3/0661; G06F 3/0673; G06F 3/0604; G06F 3/0631
See application file for complete search history.

(56) References Cited

U.S. PATENT DOCUMENTS

| 5,666,531 | A | * | 9/1997 | Martin | ................. | G11B 27/034 |
| 6,366,574 | B1 | * | 4/2002 | Baissus | ................. | H04L 7/0334 |
| | | | | | | 370/350 |
| 9,235,509 | B1 | * | 1/2016 | Kankani | ............. | G06F 12/0253 |
| 2008/0301396 | A1 | | 12/2008 | Hamada et al. | | |
| 2012/0079175 | A1 | * | 3/2012 | Flynn | ................... | G11C 7/1012 |
| | | | | | | 711/103 |

(Continued)

FOREIGN PATENT DOCUMENTS

CN 102521160 A 6/2012

OTHER PUBLICATIONS

Crane et al., "Readactor: Practical Code Randomization Resilient to Memory Disclosure", 2015 IEEE Symposium on Security and Privacy, Date of Conference: May 17-21, 2015 (Year: 2015).*

*Primary Examiner* — Morshed Mehedi
(74) *Attorney, Agent, or Firm* — Holzer Patel Drennan

(57) ABSTRACT

A data storage device includes a data store optimized organized into allocation units sized according to an sequential writing unit or garbage collection unit of the data store. Information is written to the allocation units as either coarse or fine-grained packets, which are packets of data that are self-describing and written together. Random writes received from a host to data already written into allocation units is written to another allocation unit, and a coarse-grained forward map is updated to reflect the physical location of the valid data that superseded data in the allocation unit until the allocation unit can be rewritten. Promotion operations are disclosed to compact data and garbage collect data by rewriting allocation units.

21 Claims, 10 Drawing Sheets

(56) References Cited

U.S. PATENT DOCUMENTS

| | | |
|---|---|---|
| 2014/0068208 A1 | 3/2014 | Feldman |
| 2015/0106568 A1 | 4/2015 | Feldman et al. |
| 2015/0242309 A1* | 8/2015 | Talagala ............. G06F 12/0246 711/103 |
| 2016/0232088 A1* | 8/2016 | Mohan ................ G06F 12/0246 |
| 2016/0274801 A1* | 9/2016 | Fisher .................. G06F 3/0611 |
| 2017/0147499 A1* | 5/2017 | Mohan ................. G06F 3/0616 |
| 2017/0220441 A1* | 8/2017 | Zhang ................. G06F 11/1044 |
| 2017/0357547 A1* | 12/2017 | Tsao ................... G06F 11/1076 |
| 2018/0293174 A1* | 10/2018 | Song .................. G06F 12/0246 |

\* cited by examiner

300

| Allocation Unit 302a | dir | Coarse Logical Mapping Unit (CLMU) | | | dir | parity |
|---|---|---|---|---|---|---|
| Allocation Unit 302b | dir | Coarse Logical Mapping Unit (CLMU) | | | dir | parity |
| Allocation Unit 302c | Empty | | | | | |
| Allocation Unit 302d | dir | Fine Logical Mapping Unit (FLMU) | Fine Logical Mapping Unit (FLMU) | ... Fine Logical Mapping Unit (FLMU) | dir | parity |
| Allocation Unit 302e | dir | Fine Logical Mapping Unit (FLMU) | ... | Fine Logical Mapping Unit (FLMU) fill | dir | parity |
| | ... | | | | | |
| Allocation Unit 302n | Empty | | | | | |

FIG. 3

DUAL GRANULARITY DYNAMIC MAPPING WITH PACKETIZED STORAGE

BACKGROUND

Data storage devices often use a static logical-to-physical mapping because static mappings can be driven by small and efficient tables and equations. Dynamic logical-to-physical mappings are an attractive alternative to static mappings, especially for data storage media such as NAND Flash or shingled magnetic recording (SMR) media that require or benefit from sequential writing and re-use of storage units such as erasure blocks or bands of tracks. Dynamic mappings, however, can require complicated tables that require compromises among memory size, search time, insertion time deletion time, write throughput and other factors when handling random access workloads.

SUMMARY

Implementations described and claimed herein provide a data storage device that includes a storage tier being organized into a plurality of allocation units, each allocation unit in the plurality of allocation units representing a range of physical addresses on the storage tier configured to be written sequentially with a single packet of data and a coarse-grained forward map having one or more coarse-grained forward map entries, each of the coarse-grained forward map entries identifying a physical address range of an allocation unit on the storage tier and each coarse-grained forward map entry further including a fine-grained forward map including one or more fine-grained forward map entries, each fine-grained forward map entry identifying at least a physical block address of one or more superseding physical blocks outside the allocation unit superseding one or more superseded physical blocks inside the allocation unit, each fine-grained forward map entry further identifying a logical block address corresponding to the one or more superseded physical blocks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 3 is a simplified schematic diagram illustrating the contents of data packets written to a storage media organized into dual granularity allocation units.

DETAILED DESCRIPTIONS

The present disclosure includes a system and methods for packetized storage of data on a storage media organized into dynamically allocated allocation units. The data packets are available in a coarse packet granularity and a fine packet granularity. The present disclosure is particularly relevant to data storage media that require or benefit from sequential writes such as bands of tracks on a shingled magnetic recording (SMR) media or erasure blocks on NAND Flash storage media. It is also particularly relevant for data storage devices that do not include storage media for a media cache separate from a main store or for data storage device without a reserved media cache on the main data store.

Figure 1:
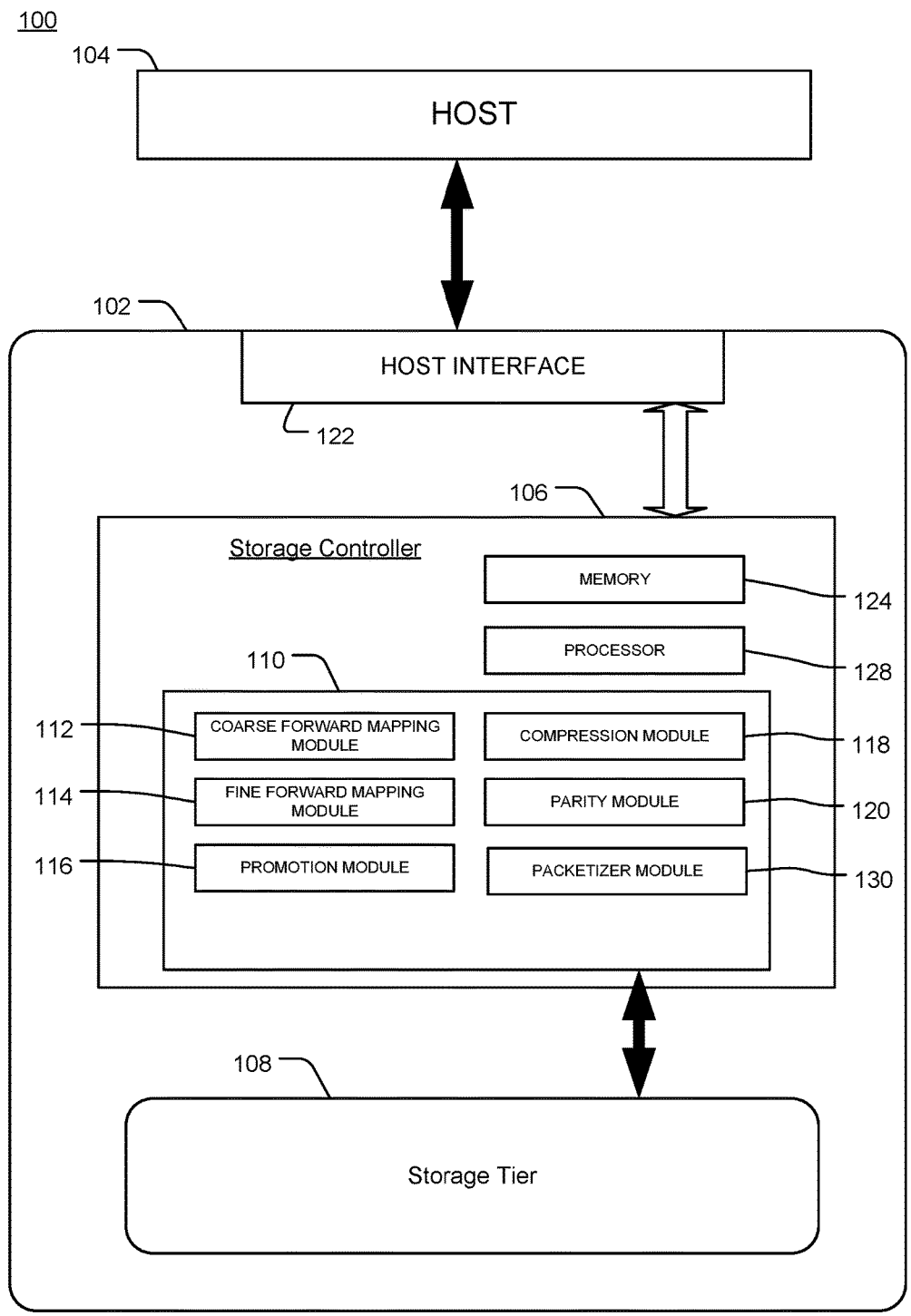
FIG. 1 is a simplified schematic diagram of an example data storage device equipped with dual granularity dynamic mapping and packetized storage.

FIG. 1 is a simplified schematic diagram 100 of an example data storage device 102 equipped with dual granularity dynamic mapping and packetized storage. The data storage device 102 employs a dynamic mapping scheme for packetized data storage with a larger, "coarse" packet size and a smaller, "fine" packet size. The physical block addresses (PBAs) space of a storage tier 108 on the data storage device is organized as allocation units. Each allocation unit is written with data for logical block addresses (LBAs) in either coarse- or fine-grained mapping units. The placement of data is tracked by the associated coarse- and fine-grained dynamic forward maps. The dynamic forward maps are in contrast to a static forward map wherein an LBA has a home location and is always mapped to the same physical sector over time unless the sector is identified as a bad sector.

The storage tier 108 is in communication with a storage controller 106. The storage controller 106 is in communication with a host 104 via a host interface 122. The storage controller 106 is configured to receive requests from a host 104 to write data to the storage tier 108 and to receive requests from the host 104 to read data from the storage tier 108. In the case of a request to write data from the host 104, the write data may be sequential, meaning the write data spans a range of LBAs, or the write data may be random, meaning the write data includes data stored in discontiguous LBAs including potentially a single LBA.

The storage controller 106 includes a variety of components for handling host requests and managing the data stored on the storage tier 108. The components of the storage controller 106 include one or more processors 128 for executing the operations described herein including the operations performed by the various modules described herein. The storage controller 106 further includes a memory 124. The memory 124 may be a volatile or non-volatile memory for storing write data from the host before it has been written to the storage tier 108. Memory 124 may also store other data such as, without limitation, mapping tables, metadata, and temporarily stored data used during promotion operations described herein.

The storage tier 108 is organized according to a dynamic mapping scheme wherein a range of PBAs is grouped as an allocation unit. In an implementation, the storage tier 108 is a homogenous storage media wherein any allocation unit is available for use in the dynamic mapping scheme. As such, the PBA range of any allocation unit may be assigned to any corresponding range of LBAs. In some implementations, the size of the allocation units is chosen based on a characteristic of the storage media that requires data to be written sequentially in sets or is chosen based on the storage media's unit of garbage collection, such as a band of SMR tracks. Accordingly, an allocation unit is either partially written by one or more sequential writes, fully written by a sequence of sequential writes, or completely evacuated. The storage tier 108 as a whole, however, need not be written sequentially. Allocation units are therefore dynamically mapped to LBAs, written to, and then evacuated by garbage collection and released to a free pool for subsequent re-write with new data for a different set of LBAs.

To handle writing data to allocation units, the storage controller 106 writes data received from the host 104 in a packetized manner. In one implementation, the size of one packet equals the size of an allocation unit. However, in an alternative implementation, an allocation unit may include multiple packets of data. The present disclosure includes two granularities of data packet: coarse and fine. Coarse-grained packets may be used when the data to be written is sequential in LBA space and will occupy the entire allocation unit. In addition to an extent of host data, coarse-grained packets may also optionally include a directory describing the contents of the packet and parity data for error detection and/or correction. Coarse-grained packets are efficient in terms of space needed for the directory because the contents are completely described by a first LBA. The coarse-grained forward map is efficient in terms of memory needed for mapping tables because each entry contained therein describes contents of the mapping in terms of a first LBA and the allocation unit physical address. Offsets values for LBAs within the coarse-grained packet are relative to the beginning address of the packet. The directory that describes the contents of the coarse-grained packet within the packet itself provides for validation of the forward map, and aids in recovery when the forward map is corrupt or out of date. A data packet with an included directory may therefore be defined as a self-describing unit that is written together into an allocation unit. In the case wherein the storage tier 108 is an SMR storage media, the size of the coarse packet and the allocation units may be chosen to be the size of an SMR band on the storage tier 108.

Another packet granularity in the present disclosure is a fine-grained packet. In an implementation, the host 104 sends write requests to the data storage device 102 to write data that is as small as a single logical block, such as a logical block as used by the LBA. In other implementations, the smallest unit the host 104 is able to write to the storage tier 108 may be larger than a single logical block, such as, for example, 8 logical blocks, but smaller than the size of a coarse logical mapping unit. A logical mapping unit is a data that is addressed consecutively in logical address space and mapped to physical media as a single unit. A logical mapping unit typically has a starting logical address that is an integer multiple of the unit size. A logical mapping unit for a disc drive may be the logical block, which is addressed by an LBA and may be 512 bytes, or may be 8 logical blocks, which may be 4096 bytes and may be addressed by a first LBA which is an integer multiple of 8; e.g., 0, 8, 16, or 24. As an example, a logical mapping unit may be 1 MiB and may be addressed by a byte offset that is an integer multiple of 1 Mi (2 to the power of 20). As used herein, fine logical mapping units are logical mapping units that do not have constraints on their size or where they start in the logical space, and coarse mapping logical units are larger than fine logical mapping units, are all of the same size and are subject to constraints as to where they start in the logical space. The write data received from the host 104 may also include random writes, meaning the data is not sequential and is therefore not suitable for writing to an allocation unit in a coarse data packet, in which case the data are written in fine logical mapping units.

A request from the host 104 may be to perform writes on LBAs that have previously been written, and the data for those LBAs were previously written to an allocation unit. In implementations wherein the data in an allocation unit must be written together, it may not be possible to re-write a data extent that is represented by all or a subset of LBAs in the allocation unit. When the storage controller 106 receives such superseding data, it is instead written to another allocation unit.

The fine-grained packet of the present disclosure is the same size as the allocation unit (and thus the same size as a coarse-grained data packet) but the fine-grained data packet contents are different than the contents of the coarse-grained data packet. Instead of a directory, a single data extent, and parity data, the fine-grained packet includes a directory, a plurality of data extents each represented by fine logical mapping units, optional fill data, and parity data. In an implementation, the size of a fine logical mapping unit is the same size as the smallest logical unit that may be written by the host 104 on the data storage device 102 (e.g., a single logical block, 8 logical blocks, etc.). Random write data sent by the host 104 to the storage device 102 may be initially stored on the memory 124. Once an extent of host data contained in a fine-grained data packet is ready, it is written into a fine logical mapping unit of an allocation unit. The fine-grained packet occupies an entire allocation unit. In one implementation a fine-grained packet is written in its entirety without interruption to the allocation unit. In another implementation a fine-grained packet is written with interruptions at one or more boundaries between fine logical mapping units. In this implementation the directory is written after the data when its complete contents are determined.

The storage controller 106 includes a plurality of modules 110 implemented using software, firmware, or combination thereof. The modules 110 may include a coarse forward mapping module 112 that correlates the range of PBAs occupied by an allocation unit to the LBAs of the data stored or to be stored in the allocation unit in a coarse-grained forward map. The coarse-grained forward map dynamically maps allocation units to LBAs, thus any allocation unit on the storage tier 108 may be used to store any coarse-grained data packet written by the storage controller 106. The coarse forward mapping module 112 updates the coarse forward map to reflect newly assigned allocation units as they are needed by the storage controller 106 or to return allocation units to the free pool. In implementations where all allocation units are of equal size, entries in the coarse-grained forward map need include the PBA of the beginning of an allocation unit. The coarse map is able to describe the complete contents of the storage tier if all of the allocation units are used for coarse-grained data packets; thus, it is a full map. If a packet written to an allocation unit is compressed, then the compressed allocation unit's entry in the coarse-grained forward map also includes a size or range of LBAs represented by the allocation unit. The coarse-grained forward map is therefore a compact, efficient mapping of the storage tier 108.

The storage controller 106 further includes a fine forward mapping module 114. The fine forward mapping module 114 produces and updates a fine forward map. The fine forward mapping module 114 is a mapping of LBAs to PBAs of fine logical mapping units contained in fine-grained packets stored in allocation units on the storage tier 108. In contrast to the coarse-grained forward map, the fine-grained forward map may be a sparse forward map. As such, the fine-grained forward map may not include a mapping of the entire LBA space. If the host 104 sends write data to the data storage device 102 that is not suitable for inclusion in a coarse data packet, then it is stored in a fine data packet. The write data sent by the host 104 may be unsuitable for a coarse data packet because it is not sequential and large enough to fill the coarse data packet. In other words, if a data packet written to an allocation unit includes data in LBAs 0000-0100, and the host 104 send a request to the data storage device 102 to re-write new data to LBA 0050, then the storage controller 106 would have to re-write the entire allocation unit including LBAs 0000-0100 to include the new data in LBA 0050 in the allocation unit. Instead of re-writing the entire allocation unit, the storage controller 106 can instead write the new write data in LBA 0050 to another allocation unit and update the fine-grained forward map for the allocation unit including LBAs 0000-0100 to identify that the data in LBA 0050 is physically stored in another allocation unit. In one implementation the fine-grained forward map has precedence over the coarse-grained forward map and the coarse-grained forward map is not updated to reflect data in coarse-grained packets that are not valid. In another implementation, the maps are constrained not to collide and re-writing data for an LBA previously written in a coarse-grained packet requires that the coarse-grained forward map entry is retired are replaced by the appropriate fine-grained forward map entries to describe the still-valid data in the coarse-grained packet.

The fine-grained forward map is therefore a sparse forward map including one or more fine-grained forward map entries. The fine-grained forward map entries may be generated in response to a random write request to an LBA wherein the PBA related to LBA in in a given allocation unit. As such random write cannot be performed by writing the data to the PBA in the given allocation unit (referred to as the superseded PBA), such data is written to a PBA in another allocation unit (referred to as the superseding PBA). In order to track the location of the superseding PBA, a fine-grained forward map entry may be created. Such a fine-grained forward map entry includes the LBA of the random write request and the superseding PBA. Furthermore, the fine-grained forward map entry may also include a pointer to another fine-grained forward map entry if there are such additional fine-grained forward map entries generated in response to additional random write requests. If there are no such additional fine-grained forward map entries, the pointer may be a null pointer.

The storage controller 106 includes a promotion module 116. The promotion module 116 is configured to perform promotion and compaction operations as described herein. As the host 104 sends write data requests to the storage device 102, the allocation units of the storage tier 108 may approach full and/or the fine-grained forward maps may become longer, thus consuming more of the memory 124. Since the storage tier 108 and the memory 124 are finite resources, they can become full and the promotion module 116 may perform promotion operations to add allocation units back to the free pool and/or to free space in the memory 124 by reducing the size of the fine-grained forward maps. Several types of promotions are disclosed herein, including a "coarse+fine-to-coarse" promotion, a "coarse-to-coarse" promotion, and a "fine-to-fine" promotion, also known as a compaction operation. Each of these operations may be viewed as a type of garbage collection operation. Each of these promotion operations is performed by the promotion module 116 and are explained in more detail below with reference to FIGS. 6-8.

In one implementation, the storage controller 106 may also include a compression module 118. Although, in one implementation, each allocation unit represents an equal number of LBAs, each allocation unit in this implementation need not represent an equal number of LBAs because the data packet in an allocation unit may be compressed. In at least one implementation, the compression module 118 measures the compressed size of write request data as it is received from the host 104. When the compressed size of the sequential write data received from the host 104 reaches the size of an allocation unit, the compression module 118 requests that the coarse forward mapping module 112 update the coarse forward map to reflect the range of LBAs represented by the compressed write data for an allocation unit and write the compressed data to the allocation unit for which the coarse-grained forward map was updated. In contrast, when the compressed size of the sequential write data received from the host 104 is less than the size of an allocation unit, the compression module 118 requests that the fine forward mapping module 112 update the fine forward map to reflect the range of LBAs represented by the compressed write data for an allocation unit and write the compressed data to the allocation unit for which the fine-grained forward map was updated.

Compressing data packets is particularly suited to data packets of coarse granularity because the payload of the coarse data packets is larger in contrast to the payload of the fine data packets, which is composed of multiple smaller fine logical mapping units. Since larger payloads compress more efficiently than smaller payloads, compressing coarse data packets permits greater effective storage space on the storage tier 108. A compressed coarse packet, however, does require more memory space in the coarse-grained forward map to describe its contents than an uncompressed data packet because compressed coarse-grained data packets have a variable LBA range due to variations in compressibility of data. An entry in the coarse-grained forward map for a compressed coarse data packet must therefore also specify the size or range of LBAs contained in the data packet.

The storage controller 106 further includes a parity module 120. The parity module 120 may treat the payload in a data packet as comprising one or more codewords that can provide redundancy, error detection, and error correction. There are also opportunities for the parity module 120 to insert non-payload data or symbols into a packet. For example without limitation, a fine data packet may include multiple fine logical mapping units of host data but not enough such units to completely fill the packet. The storage controller 106 further includes a packetizer module 130 which may insert fill data to force the fine-grained data packet to grow to the size of the allocation unit.

Figure 2:
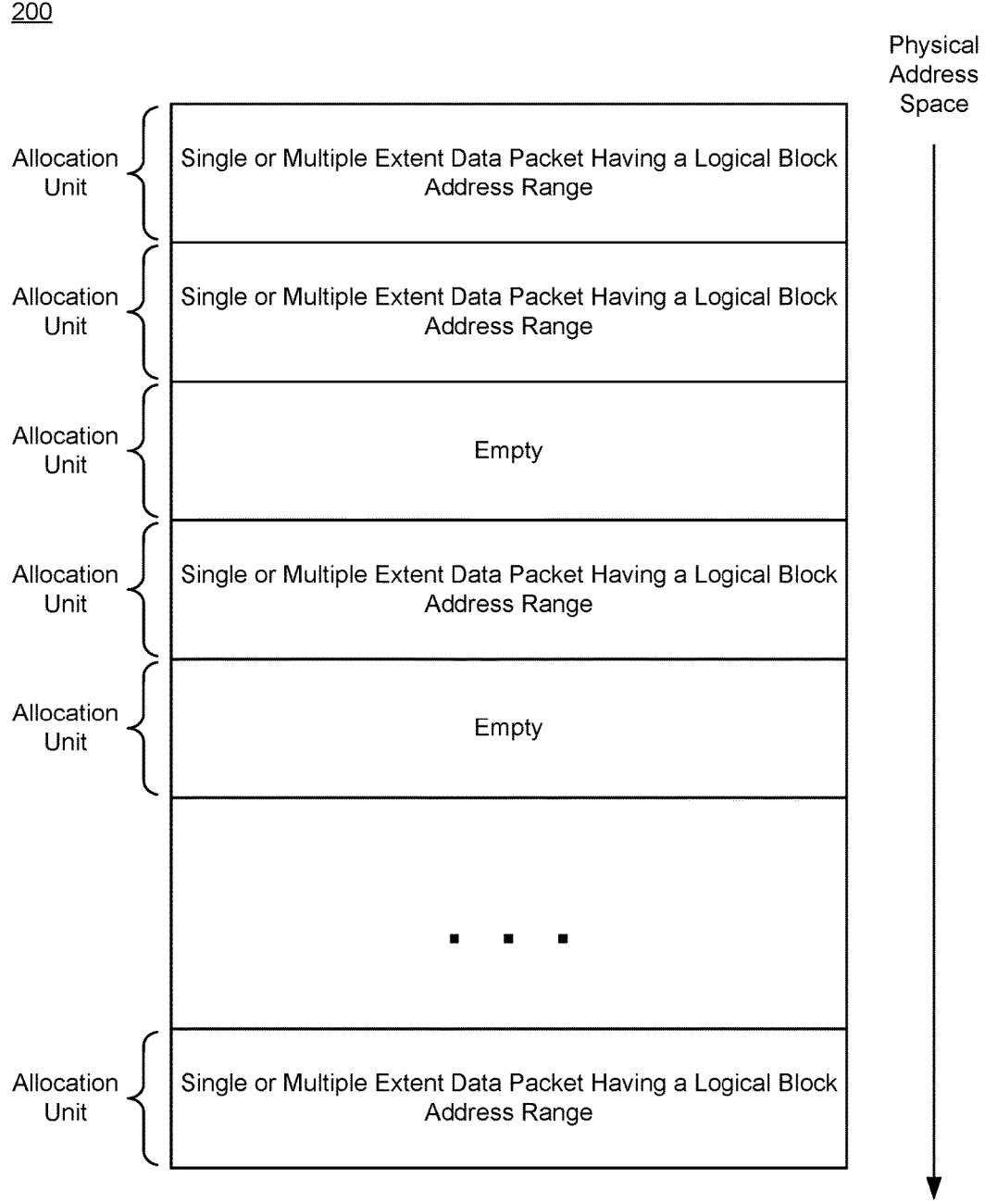
FIG. 2 is simplified schematic diagram illustrating an example storage media organized into dual granularity allocation units for packetized storage.

FIG. 2 is simplified schematic diagram illustrating an example storage tier 200 organized into dual granularity allocation units for packetized storage. Unlike a statically mapped storage media where an LBA has a home location and occupies the same physical sector over time, the storage tier 200 is a homogenous memory that is dynamically mapped into a plurality of allocation units. In one implementation, the allocation units may be chosen as the atomic unit of garbage collection for the storage tier. For example, if the storage tier 200 is an SMR storage tier, then the storage tier 200 may include various SMR bands where each band has multiple allocation units that are written together to preserve the integrity of the data on the SMR band. In such implementation, where the storage tier 200 includes SMR bands, an allocation unit in a free pool may not be available to be allocated unless it is the last allocation unit of an SMR band or the next allocation unit is also in the free pool. The allocation units on the storage tier 200 may contain either a coarse data packet or a fine data packet, or may be completely evacuated.

The storage tier 200 need not be a storage tier that requires sequential writes to the allocation units. Conventional storage media may also be used and will benefit from the organization of the storage tier as dynamically mapped to the plurality of allocation units because data that is co-located in the LBA space is written together, which may be done, for example, on a single revolution of rotating magnetic media. Organizing the storage tier into allocation units also provides a sorting effect that improves random write ordering. Such organization allows a drive to efficiently handle a "burst" of random writes, and then re distribute the data in the background and it also allows a drive to migrate/place hot data to higher performing sections of media, such as outer diameter (OD) providing higher bit rates.

Each allocation unit in the storage tier 200 includes a range of PBAs. The amount of data stored in the allocation unit may be variable, depending on whether the payload of a data packet written to an allocation unit has been compressed. Coarse data packets in particular benefit from compression because better compression ratios tend to be achievable on data packets with larger payloads.

Dynamically mapped allocation units of equal size allows the storage tier to be organized as a pool of equal-sized storage units. As allocation units are allocated to store either a coarse or fine data packet, the free pool of allocation units shrinks. In the case of SMR storage media, since the storage tier is dynamically mapped, it is not necessary to perform a band rewrite operation in place because the rewritten band need not correspond to the same range of LBAs after the rewrite operation as before the rewrite operation. Instead, the storage controller may select a different allocation unit from the free pool of allocation units to house the data at the LBA range of the rewritten band and the prior allocation unit may be used for a different purpose or returned to the free pool because an allocation unit is either completely written or completely evacuated.

Dynamic mapping of the storage tier allows for greater flexibility than static mapping because the ratio of allocation between fine- and coarse-grained data packets may be adjusted to tune the data storage device to respond more efficiently to different types of workloads. For example, if the system is to be optimized to handle a large number of random writes located at various parts of the LBA space, then more allocation units may be allocated to fine-grained data packets. On the other hand, if the system is to be optimized to efficiently handle large amounts of sequential data, such as streaming video, then coarse data packets may be chosen as the dominant use of the storage tier because coarse packets can store more data due to a smaller directory, have better compression performance, and will provide improved read performance for sequential reads. The data storage device also responds well to changing workloads that may vary from heavy random writes at times to large amounts of sequential data at other times because the type of data packet for each allocation unit is determined dynamically and can be chosen on a per-allocation unit basis as data arrives from the host.

There are several competing concerns to take into account when choosing the size of the allocation units. If a smaller size is chosen for the allocation units, then a larger map in volatile memory will be needed to describe them. Since volatile memory is a limited resource, it may be desirable to keep the size of the map to a minimum. The map can be designed, however, to minimize the amount of space needed to describe the allocation units. If the allocation units are a fixed size in LBA space, then it is not needed to include a starting LBA or an extent in the map. Instead, it can be chosen at manufacture time that the storage tier should be mapped into allocation units of a fixed size. For example, at 10 GB drive may be mapped into 1,000 allocation unit entries of 10 MB each. The map for this exemplary allocation unit size choice is simply an array with 1,000 entries. Each entry in the array may hold the PBA where each allocation unit starts. On the other hand, if the allocation units support compression, then the descriptive map would need to include more information, such as extent information describing the length in logical address space represented by each allocation unit, which could vary from allocation unit to allocation unit due to differences in compressibility of the data stored in each unit.

If it is desired to minimize the amount of volatile memory on the storage device, for example to reduce manufacturing costs, then a larger allocation unit size may be chosen. In one implementation, the location of a coarse packet may be mapped using 32 bits. In this case the locations of 1,000,000 allocation units may be mapped using only 40 MB of volatile memory. Despite the relatively small size of the descriptive map, it still describes the storage tier with a high granularity. Such a map can describe the storage tier with a granularity down individual sectors of the media due to the small amount of data needed to describe each allocation unit in the map itself and because the data packets are self-describing (e.g., the data packets contain directory information that describe the logical offset of any data extent within the packet). In the case of an SMR storage tier, it may be advisable to choose an allocation unit size such that the allocation unit spans multiple tracks on the storage media. Spanning multiple tracks has another advantage, which is that each track may contain parity data but also parity data may be spread across tracks.

FIG. 3 is a block diagram illustrating the contents of data packets written to a storage tier 300 organized into dual granularity allocation units 302a-302n. The two types of data packets are each characterized by their respective contents. Fine-grained data packets contain a directory or table of contents, multiple extents of host write data (each of which may be as small as the atomic unit of writing on the storage media such as a single logical block, eight logical blocks, etc.), optional fill data, optionally another directory or another portion of the directory, and parity data. In one implementation, the size of an allocation unit may be chosen to have an extent of 10 MB of PBA space. When the allocation units are chosen to be 10 MB of PBA space, then the payload of a fine data packet would be approximately 20,000 fine-grained logical mapping units, each fine-grained logical mapping unit being 512 bytes. Since the size of a fine-grained data packet is constant and significantly larger than the atomic unit of writing itself, error correction codes in the parity data apply to the entire data packet, improving error correcting performance. Optional fill data may be used in a fine-grained packet if it beneficial for the storage controller to write the fine-grained packet before the host has sent enough random writes to completely fill the packet, such as, for example, if a host begins to send sequential data that is appropriate for a coarse data packet, if the host submits a flush command before the fine-grained packet is full, etc. Using fill data to complete a fine-grained packet is preferable to leaving an extent of the packet empty because there is no advantage to skipping sectors and known data patterns in the fill portion of the packet can strengthen error recovery performance.

The contents of coarse data packets include a directory or table of contents, a payload of host data, optionally another directory or another portion of the directory, and parity data. In a coarse-grained data packet, the payload of host data is a single data extent in contrast to fine-grained packets where the payload includes multiple smaller data extents. The directory in a coarse-grained packet therefore needs one piece of information, the offset of the payload data in the data packet.

Figure 4:
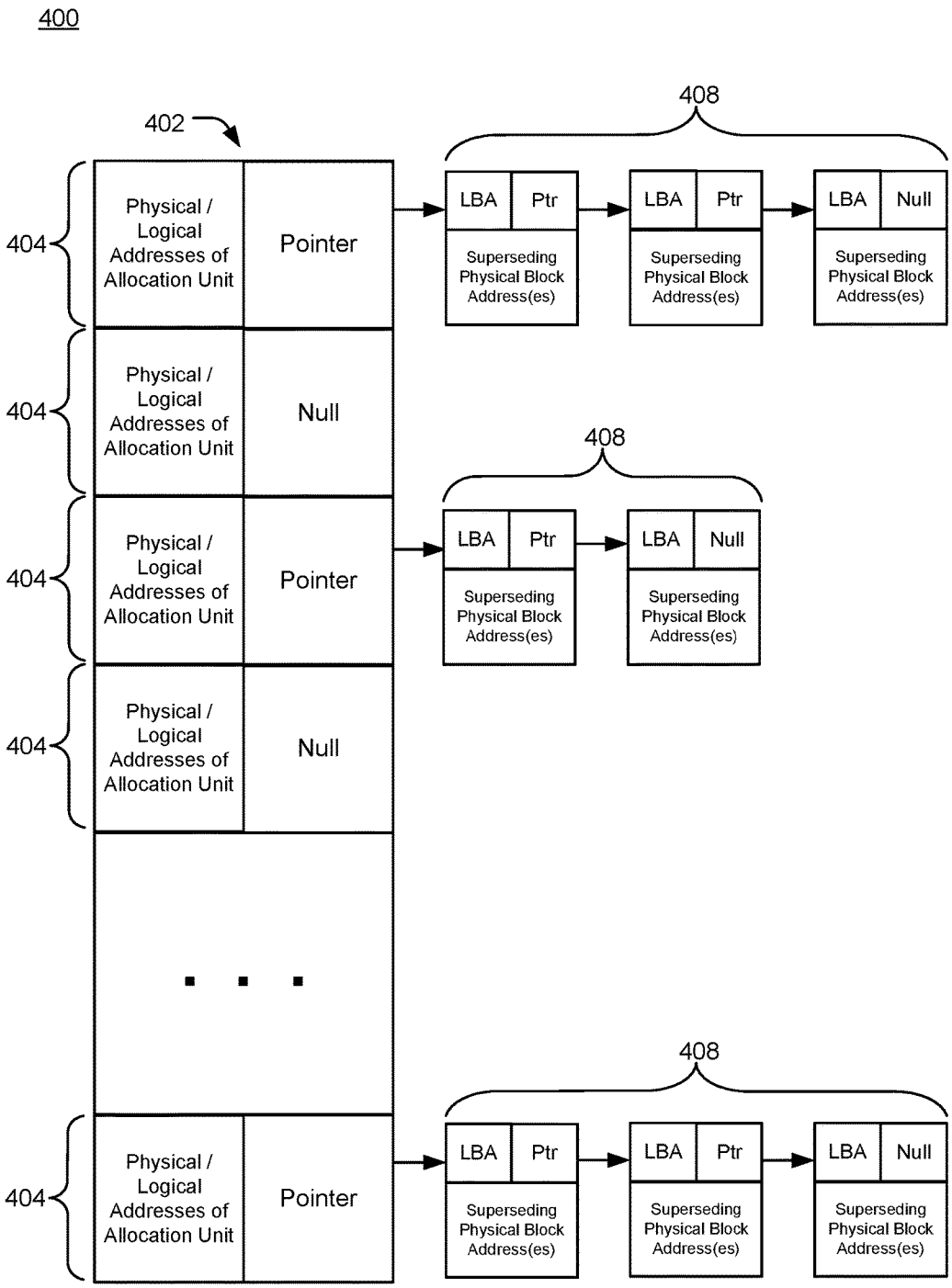
FIG. 4 is a simplified schematic diagram of example coarse-grained and fine-grained forward maps in a data storage device equipped with a storage media organized into dual granularity allocation units for packetized storage.

FIG. 4 is a schematic diagram of a unified forward map 400 including a coarse-grained forward map 402 in a data storage device equipped with storage tier organized into dual granularity allocation units for packetized storage and a plurality of fine-grained forward maps 408. Each of the entries 404 in the coarse-grained forward map 402 corresponds to an allocation unit on the storage tier of the data storage device and includes information relating to the allocation unit. Specifically, each of the entries 404 further identifies that the allocation unit referenced by the entry stores a coarse data packet.

In an implementation wherein all allocation units are of equal size in the PBA space and the data packets written to the allocation units are not compressed, then the entries in the coarse-grained forward map need contain only the starting PBA of the allocation unit and a pointer to a sparse fine-grained forward map for the allocation unit. If all allocation units are of equal size and the starting PBA is known for each allocation unit, then the storage controller can determine the extent of the allocation unit in LBA space for allocation units containing uncompressed data and can determine the correspondence between LBAs and PBAs for any allocation unit because the data extent in the LBA space matches the data extent in PBA space.

If the allocation units on the data storage media are not all of equal size or if the data packets written to the allocation units are compressed, then the entries 404 of the coarse-grained forward map may contain additional information regarding the extent of the allocation unit in LBA space. It is actually not necessary to include information regarding the extent of an allocation unit in the coarse-grained forward map 402 because the data packets, both coarse and fine, are self-describing units due to the inclusion of a directory in the data packets. The directory of the data packet, which may be split into two parts or included in the data packet twice for redundancy purposes, describe the contents of the data packet. A storage controller therefore needs to know the starting PBA of an allocation unit to be able to access any of the contents therein.

If information regarding the logical extent of an allocation unit is not contained in the entries 404 of the coarse-grained forward map 402, there is a performance cost because the storage controller would need to read logical extent information from the directory of the data packet itself. On the other hand, omitting logical extent information from the entries 404 of the coarse-grained forward map 402 reduces the size of the coarse-grained forward map, and thus requires less volatile memory resources than a coarse-grained forward map with the same number of entries that does include logical extent information. It is therefore an implementation choice whether to include logical extent information in the entries 404 of the coarse-grained forward map 402 that will depend balancing performance against the memory resources available on the data storage device.

The entries 404 of the coarse-grained forward map 402 include pointers to entries in a fine-grained forward map 408 corresponding to each allocation unit. Since the fine-grained forward map 408 is sparse, it need not include entries for all LBAs in the allocation unit. The fine-grained forward map entries may be generated in response to a random write request to an LBA wherein the PBA related to LBA in in a given allocation unit. As such random write cannot be performed by writing the data to the PBA in the given allocation unit (referred to as the superseded PBA), such data is written to a PBA in another allocation unit (referred to as the superseding PBA). In order to track the location of the superseding PBA, a fine-grained forward map entry may be created. Such a fine-grained forward map entry includes the LBA of the random write request and the superseding PBA. Alternatively, instead of storing an entire LBA, only an offset from the "parent" coarse grained packet is stored. Furthermore, the fine-grained forward map entry may also include a pointer to another fine-grained forward map entry if there are such additional fine-grained forward map entries generated in response to additional random write requests. If there are no such additional fine-grained forward map entries, the pointer may be a null pointer. Furthermore, each of the entries 408 further identifies that the allocation unit referenced by the entry stores a fine data packet.

A fine-grained forward map 408 for a particular allocation unit may not exist at all if there are no superseded entries for that particular allocation unit. If a fine-grained forward map for a particular allocation unit does not exist, then the pointer in the allocation unit's entry 404 in the coarse-grained forward map is a null pointer. If a fine-grained forward map 408 does exist for an allocation unit, then the pointer in the coarse-grained forward map entry 404 points to the first element of the fine-grained forward map 408.

The fine-grained forward map 408 may be implemented in a variety of ways. One way to implement the fine-grained forward map 408 is with a linked list as illustrated in FIG. 4. The entries of the fine-grained forward map 408 contain LBA ranges of any LBAs that have been superseded in the allocation unit associated with the fine-grained forward map 408 (e.g., the allocation unit corresponding to the entry 404 in the coarse-grained forward map). Ranges of LBAs may become superseded in any implementation wherein all the data in an allocation unit must be written together (e.g., in a band of tracks on SMR media). If the host sends a random write request for any subset of LBAs in an allocation unit that has already been written on such a storage media, then it is not possible for the storage controller to simply overwrite a subset of logical blocks in the allocation unit. Instead, the storage controller will write the new random write request data to a different allocation unit allocated to store a fine data packet with the random write request data contained in the fine data packet in a fine logical mapping unit. To track the location of the random write data in the different allocation unit, the storage controller will insert or append a new entry to the fine-grained forward map 408. The entry in the fine-grained forward map 408 includes the LBA range of the superseding data and the starting PBA of the superseding data in the different allocation unit. Each entry in the fine-grained forward map 408 also contains a pointer to the next element in the data structure. In an implementation illustrated by FIG. 4, the data structure is a linked list and the pointer in each element of the linked list points to the next element in the list or is a null pointer.

In one implementation, the fine-grained forward map 408 may be viewed as a higher level cache and the coarse-grained forward map 402 may be viewed as a main store in the sense that the fine-grained forward map 408 is not the cache of any other data store. The coarse-grained forward map 402 has a list of the data that is contained therein. If any searched-for data is not contained in the coarse-grained forward map 402, then a storage controller may go to the next level of cache (e.g., the fine-grained forward map 408).

When the storage controller receives a read request from a host for data in a LBA range included in an allocation unit, the storage controller must locate the entry 404 in the coarse-grained forward map 402 that includes the requested LBA range and check the fine-grained forward map 408 (if any) to locate any superseded data in the requested LBA range. If there is no fine-grained forward map 408, then the storage controller may sequentially read the data in the requested LBA range, which would be stored together in the allocation unit, and return the read data to the host. If there is a fine-grained forward map 408, then the storage controller must locate any superseding data in other allocation units identified by the entries in the fine-grained forward map 408, read the superseding data located in other allocation units, and return the superseding data together with any non-superseded data from the requested LBA range to the host.

In one implementation, the LBAs included in the entries of the fine-grained forward map 408 are not full LBAs. Instead, the LBAs included in the entries of the fine-grained forward map 408 could be logical offsets with respect to the start of the allocation unit corresponding to the entry 404 in the coarse-grained forward map 402. The remainder of the elements of the fine-grained forward map 408 then need to include a PBA of the superseding data and a length of the superseding data.

In one implementation, the storage controller orders the entries in the fine-grained forward map 408 according to a sort order. One possible sort order for the entries in the fine-grained forward map 408 is in order of increasing address in the LBA space. If the entries of the fine-grained forward map 408 are ordering in increasing LBA space, then the storage controller need not search an entire fine-grained forward map 408 to determine whether the data representing a particular LBA range has been physically superseded in a given allocation unit. Instead, the storage controller need only search entries in the fine-grained forward map until the storage controller finds an entry that has a higher LBA range than the searched-for LBA range. Since the entries in the fine-grained forward map 408 are in increasing order in LBA space, the storage controller may stop searching after the storage controller finds the first entry in the fine-grained forward map 408 that has an LBA range higher than the searched-for LBA since the searched-for LBA must not be data that has been superseded in the allocation unit. The storage controller can accordingly read the searched-for LBA range from the allocation unit corresponding to the entry 404 in the coarse-grained forward map without searching the remainder of the fine-grained forward map 408.

Choosing the size of allocation units on the data store has implications for the size of the fine-grained forward map 408. As the chosen size of an allocation unit grows, the number of potentially superseded extents within the allocation unit also grows. In other words, a larger allocation unit has more opportunities to contain stale data if the host sends random write requests to LBAs in the allocation unit. More superseded LBAs in an allocation unit will cause the fine-grained forward map 408 to increase in size to accommodate mapping of the superseded LBAs. Larger allocation units may also cause a decrease in read performance due to the time needed to search the larger fine-grained forward maps, especially for workloads that include many random writes. For workloads where large amounts of sequential writes and reads are dominant, the performance cost of larger allocation units is minimized and may be preferable due to the improved compression performance of larger packets, which would be possible with larger allocation units.

Figure 5:
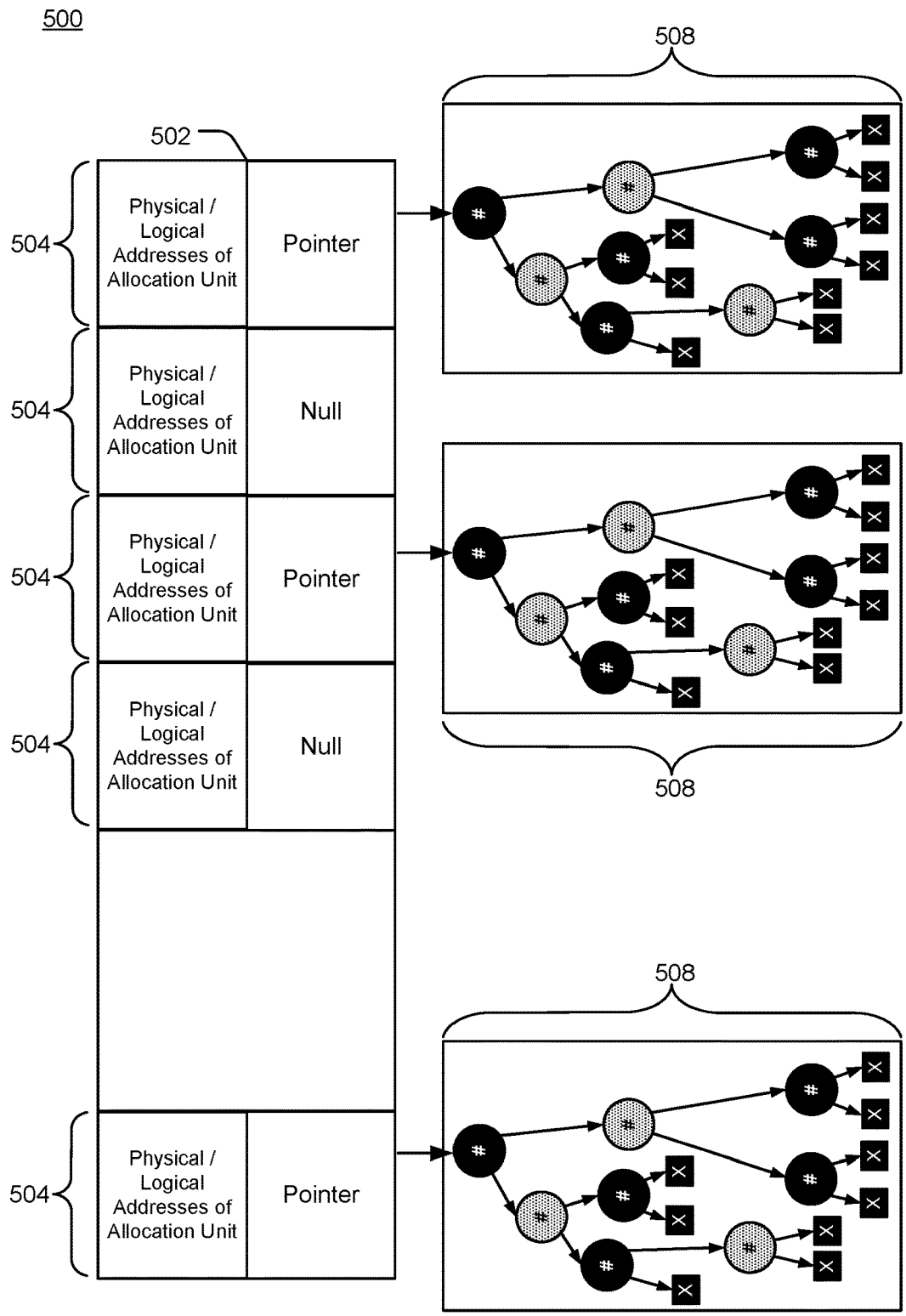
FIG. 5 is a simplified schematic diagram of another example of coarse-grained and fine-grained forward maps in a data storage device equipped with storage media organized into dual granularity allocation units for packetized storage.

FIG. 5 is a schematic diagram of a unified forward map 500 including a coarse-grained forward map 502 in a data storage device equipped with storage tier organized into dual granularity allocation units for packetized storage and a plurality of fine-grained forward maps 508. The coarse-grained forward map 502 is the same as the coarse-grained forward map illustrated in FIG. 4 except that the pointer in each entry 504 of the coarse-grained forward map 502 is either a null pointer or points to an element of a fine-grained forward map 508 that is in the form of a binary tree. Specifically, each of the entries 504 further identifies that the allocation unit referenced by the entry stores a coarse data packet.

In the implementation illustrated in FIG. 5, the coarse-grained forward map 502 may be thought of as the top level of a binary tree. If searched-for data in a range of logical addresses is in a data packet and has not been superseded, then it may be found by the storage controller in the coarse-grained forward map 502. On the other hand, if searched-for data has been superseded, then the storage controller may find the new physical location of the data in the searched-for logical address range by traversing a tree that serves as the fine-grained forward map 508. Furthermore, each of the entries 508 further identifies that the allocation unit referenced by the entry stores a fine data packet.

The fine-grained forward map entries may be generated in response to a random write request to an LBA wherein the PBA related to LBA in in a given allocation unit. As such random write cannot be performed by writing the data to the PBA in the given allocation unit (referred to as the superseded PBA), such data is written to a PBA in another allocation unit (referred to as the superseding PBA). In order to track the location of the superseding PBA, a fine-grained forward map entry may be created. Such a fine-grained forward map entry includes the LBA of the random write request and the superseding PBA. Furthermore, the fine-grained forward map entry may also include a pointer to another fine-grained forward map entry if there are such additional fine-grained forward map entries generated in response to additional random write requests. If there are no such additional fine-grained forward map entries, the pointer may be a null pointer.

Choosing a binary tree as the fine-grained forward map 508 improves search time because the storage controller need not search every entry of the fine-grained forward map 508. Or, in the case of a fine-grained forward map that is ordered in ascending LBA space, the storage controller does not need to search every entry of the fine-grained forward map until it finds an LBA that is higher than the searched-for LBA. Instead, the storage controller can traverse the binary tree and locate the searched-for entry in a time period that is often better than linear search time, depending on the type of binary tree used (e.g., B+ tree, red/black tree, etc.).

Using a binary tree as the fine-grained forward map 508 introduces a memory cost because each of the entries in the binary tree must contain at least two pointers instead of the single pointer used in the linked list implementation of the fine-grained forward map. Unlike the coarse-grained forward map, which must map the entire PBA space of the storage tier, and thus is likely to occupy a statically allocated portion of the volatile memory on the storage device, the fine-grained forward map may be dynamically allocated, which may reduce the memory footprint of the fine-grained forward map in volatile memory, especially for certain types of workloads.

In one implementation, there is no need to allocate memory for the fine-grained forward map for unwritten data because of the use of special pointers in the coarse- and fine-grained forward maps. The storage tier at manufacture time could include a portion wherein the media has been pre-written with a known pattern (e.g., all zeros, a repeating recognizable pattern, etc.). Alternatively, or additionally, the entries 504 in the coarse-grained forward map that have not yet been written to with a data packet could include special pointers to an invalid PBA such as an address outside the PBA range of the storage tier. The storage controller may interpret either scenario to mean there is no data packet for any allocation unit having the special pointer or an address with the pre-written known pattern. If a read request is received from the host for data in an allocation unit with either characteristic, then the storage controller may conclude that the LBA has not yet been written. Therefore it is not necessary to grow the size of the fine-grained forward map to accommodate read requests for unwritten data. In an alternative implementation, the controller may return fabricated data if it determines that the LBA has not been written. For example, such fabricated data may be a data pattern including all zeros.

Figure 6:
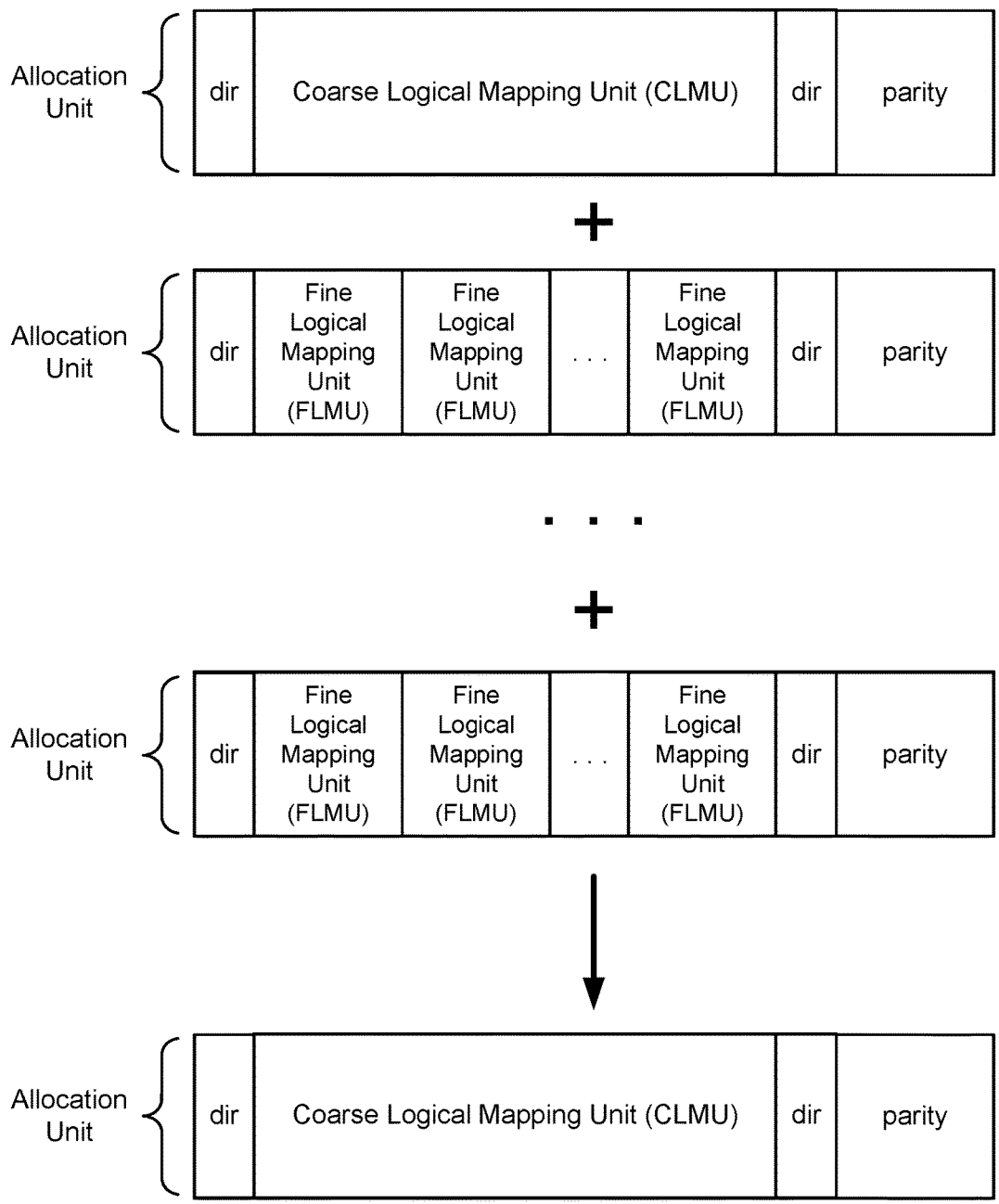
FIG. 6 is a schematic diagram of an example promotion operation combining the valid data in a fine data packet with the valid data in a coarse data packet to output a coarse data packet.

FIG. 6 is a schematic diagram of an example promotion operation 600 combining the valid data in a fine data packet with the valid data in a coarse data packet to output a coarse data packet. Promotion operation 600 is one of several available promotion operations that may be used to consolidate the data in allocation units, thus freeing up allocation units to the free pool and reducing the amount of memory needed to map the storage tier.

The promotion operations may be used in several scenarios. In one example, if the pool of allocation units is nearing full, the storage controller may perform promotion operations to return allocation units to the free pool for use in future incoming write requests from the host. In another example, if the storage device receives a workload from the host that involves a large number of random writes to data in allocation units, then the fine-grained forward maps may grow too large to fit into available volatile memory and may need to be reduced in size. In yet another example, data in the allocation units may become fragmented due to random writes and read throughput performance may be reduced. Servicing read requests on highly fragmented allocation units may consume a large amount of resources and result in diminished read throughput because the storage controller cannot perform a sequential read. For example, if the host submits a read request for 10 MB of data on the storage tier, and the requested data has been the subject of many previous random write requests, then (in a worst case scenario) the storage controller may need to perform as many as 2,500 disk operations to complete the read operation because the data may be contained in many fine logical mapping units distributed throughout the PBA space. Such a level of fragmentation is not uncommon under practical workloads, such as, for example, online databases. Each scenario outline above may be treated with one or more of the promotion operations disclosed herein.

In at least one implementation, a set of policies govern which allocation units are selected for the various promotion operations. One policy is to improve read performance by decreasing fragmentation. Under this policy, one of the most, or perhaps the most, fragmented coarse data packets is selected. One way of identifying a candidate coarse-grained data packet is to choose the coarse-grained data packet with the largest fine-grained data packet associated with it (e.g., the longest linked list, the binary tree with the most entries, etc.). This coarse-grained packet is likely to be the most fragmented and also is likely to be the coarse-grained packet that consumes the most volatile memory to store the fine-grained map. For example, for a 10 MB coarse map entry that is fragmented into 2500 fine entries, each being 8 bytes, the fine-grained forward map may be as large as approximately 20,000 bytes. The total size of the fine-grained map may grow based on content of the fine-grained mapping unit.

Once a coarse data packet has been chosen for promotion, the promotion operation 600 is similar to a defragmentation operation that may be a coarse+fine-to-coarse operation. First, the storage controller reads all the data in the coarse data packet that has not been superseded by data in fine packets. Next, the storage controller reads all the superseding data in fine data packets located elsewhere in the PBA space by traversing the fine-grained forward map. At this point, the storage controller has all the data corresponding to the coarse data packet chosen for operation 600. The storage controller then selects an evacuated allocation unit somewhere on the storage tier, updates the coarse forward map to reflect that the chosen allocation unit will now contain the LBA range that had previously been stored in the chosen coarse data packet and all the fine data packets containing superseded data, and writes all the data to the new allocation unit sequentially. Once the new allocation unit has been written, the storage controller may update the forward map again to reflect that the allocation unit that previously contained the chosen coarse data packet is now returned to the free pool. Lastly, the storage controller may delete the fine-grained forward map that was previously associated with the chosen coarse data packet. The promotion operation 600 thus frees up available volatile memory on the storage device, reduces fragmentation, frees available storage space, and improves read throughput.

Figure 7:
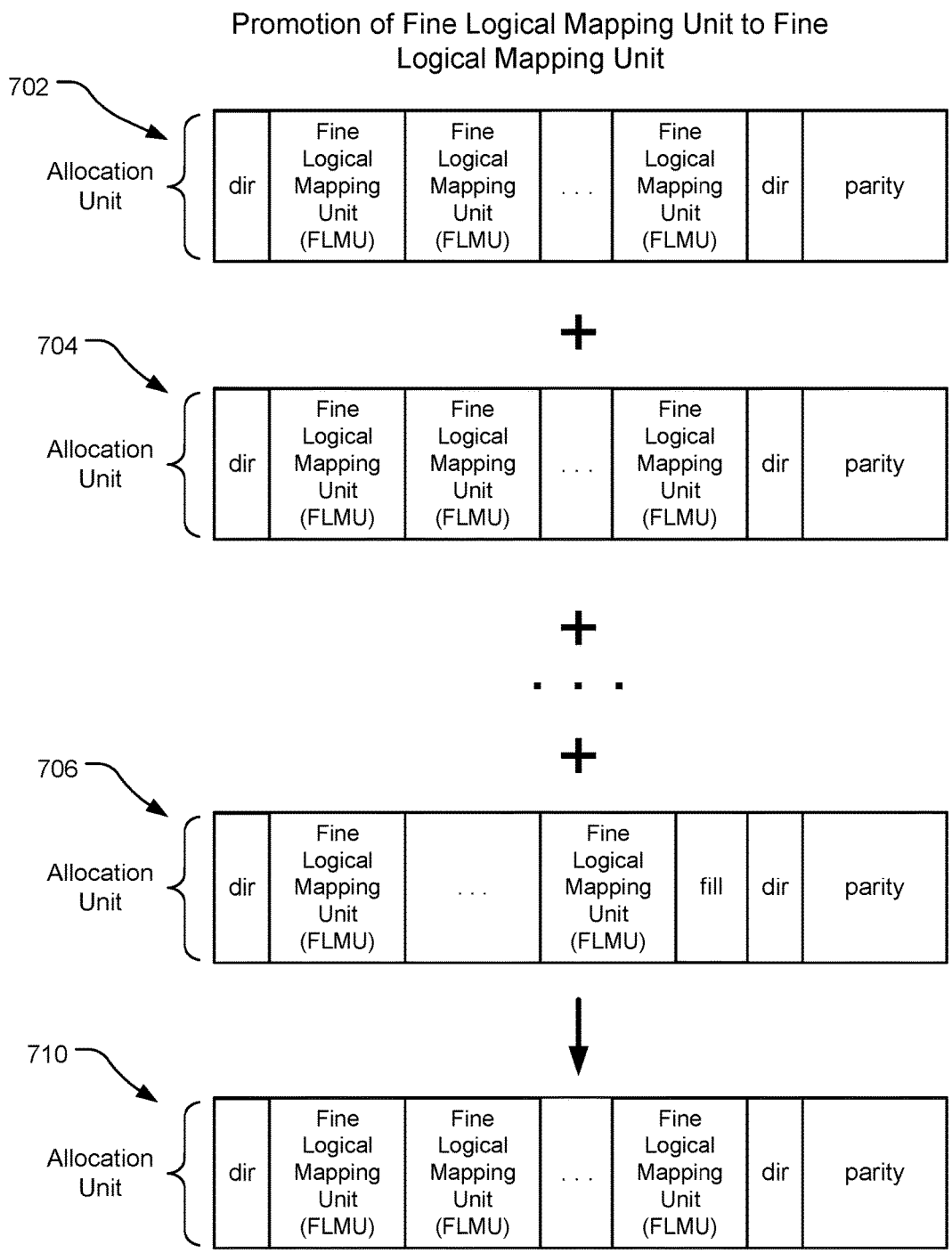
FIG. 7 is a schematic diagram of an example promotion operation combining the valid data in one or more fine data packets to output at least one fine data packet.

FIG. 7 is a schematic diagram of an example promotion operation 700 combining the valid data in one or more fine data packets to output at least one fine data packet. One side effect of the promotion operation 600 described with reference to FIG. 6 is that some data in fine logical mapping units in various fine data packets has become stale because that data has been rewritten into a new coarse-grained packet. If this stale data is allowed to accumulate, then the free pool of allocation units may eventually run out. Promotion operation 700, also referred to herein as a fine-to-fine promotion operation, is available to counteract the problem of stale data distributed in fine data packets.

In promotion operation 700, the storage controller identifies two or more fine data packets with some amount of stale data in each. In one example, the storage controller identifies two fine data packets, each of which has one-half valid data and one-half stale data. The storage controller reads the contents of both fine data packets and selects an evacuated allocation unit as a target for the valid data in both packets. The storage controller then writes the valid data from the two fine data packets into the new allocation unit, then updates as many fine forward maps as necessary to reflect the new physical locations of the valid data that had been contained in the two fine data packets. Since fine data packets may include many fine logical mapping units of data from logical address ranges throughout the logical address space, those fine logical mapping units could correspond to the logical address ranges of any allocation units. After the fine forward maps have been updated, the storage controller may evacuate the allocation units containing the two fine data packets that were inputs to the promotion operation 700, thus returning those allocation units to the free pool.

Although the above example includes two fine data packets as inputs to the promotion operation 700, a larger number of fine data packets may also be used as inputs. For example, the promotion operation 700 could take three data packets as inputs if each of the three fine data packets contains one-third valid data and two-thirds stale data. In a system wherein fine data packets include N fine logical mapping units of data, then the maximum number of fine data packet inputs to promotion operation 700 is N fine data packets.

In another implementation, the promotion operation 700 may output more than two fine data packets. For example, if the promotion operation 700 takes six data packets that are each two-thirds full of valid data and one-third full of stale data, the promotion operation 700 could output four fine data packets full of valid data. The number of fine data packets output by promotion operation 700 need not comprise an integer number of full fine data packets. If there is a remainder of a fine data packet, then that fine data packet may be padded with fill data to bring the size of the fine data packet up to the size of an allocation unit.

The promotion operation 700 may be referred to as a compaction operation. Specifically the promotion operation 700 combines data from two or more fine grained packets into a single fine-grained packet. In other words, the promotion operation 700 moves fine logical mapping units from one allocation unit to another. Promotion operation 700 does, however, add allocation units to the free pool of allocation units, thus the term compaction is appropriate. Promotion operation 700 may also be termed a garbage collection operation due at least to the characteristics outlined above.

Figure 8:
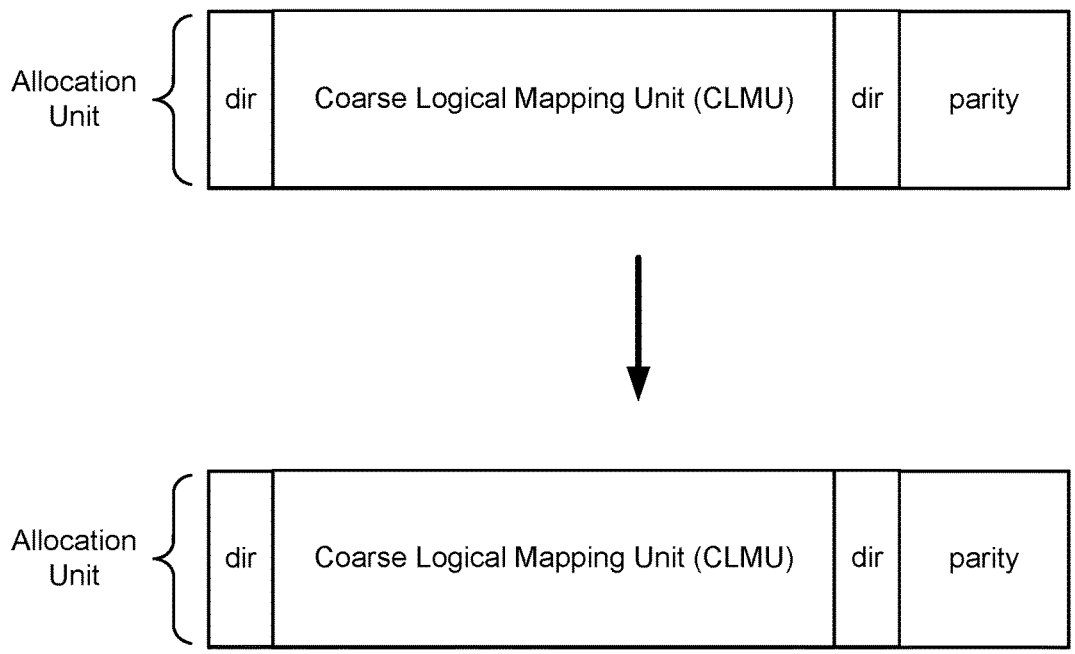
FIG. 8 is a schematic diagram of an example promotion operation combining the valid data in a coarse data packets to output a coarse data packet.

FIG. 8 is a schematic diagram of an example promotion operation 800 combining the valid data in a coarse data packet to output a coarse data packet. In some implementations, the size of the allocation units is chosen to be relatively smaller, such as 10 MB. This size choice may perform well on some systems, but other systems may benefit from larger allocation units. For example, a size 10 MB may be too small to encompass a band of tracks on an SMR storage media. Some SMR storage media may have bands of tracks that are much larger, such as 250 MB. If the size of the allocation units is chosen to be the size of the larger SMR bands of tracks, then there may be considerably fewer allocation units available on a data storage device compared to a storage media of the same size with relatively smaller allocation units. A large band of tracks on an SMR storage media may also by covered by a number of allocation units, such as, for example, a 250 MB SMR band covered by 25 allocation units of 10 MB each.

When there is a relatively lower number of total allocation units available, a storage controller may identify an allocation unit with a coarse data packet as being stale when a certain fraction of the data in the coarse data packet is superseded. The storage controller may search for and identify an SMR band that is dominated by coarse data packets that are partially or completely stale. To perform promotion operation 800, the storage controller may read all the allocation units in a first SMR band and write the valid data from those allocation units as coarse data packets into a new SMR band. Since all the valid data from the first SMR band has been rewritten, the allocation units from the first SMR band are returned to the free pool. Since not all the data in the first SMR band was valid, the valid data will not completely fill the new SMR band. This does not pose a problem because the remaining allocation units in the new SMR band may be filled with new data in either coarse or fine data packets.

Figure 9:
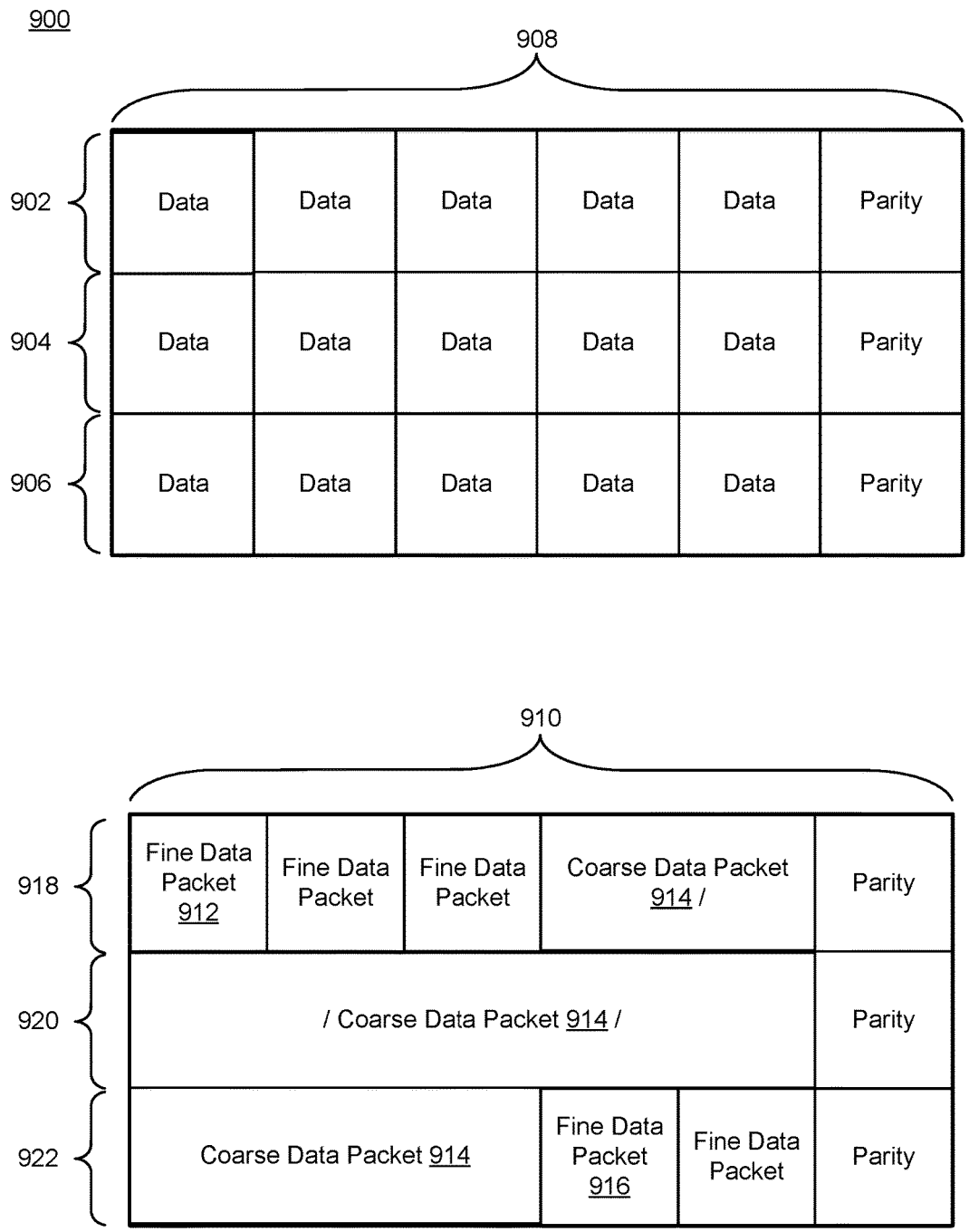
FIG. 9 is a simplified schematic diagram of NAND Flash erasure blocks in a data storage device equipped with data store organized into dual granularity allocation units for packetized storage.

FIG. 9 is a simplified schematic diagram 900 of garbage collection unit 908 and 910 in a data storage device equipped with a storage tier organized into dual granularity allocation units for packetized storage. In an implementation, garbage collection units 908 and 910 are NAND Flash erasure blocks. Some aspects of organizing a storage tier into dual granularity allocation units for packetized storage are different on NAND Flash erasure blocks as compared to other types of storage media described herein. Garbage collection unit 908 includes stripes 902, 904, and 906 with each row including a number of atomic writing units marked as "data." In an implementation, the atomic writing units are NAND Flash pages. The actual number of atomic writing units in a stripe 902, 904, and 906 of a garbage collection unit 908 is likely to be far greater than what is illustrated in FIG. 9. FIG. 9 is merely a simplified schematic diagram to illustrate the principles described herein and is not necessarily drawn to scale. At the end of each of the stripes 902, 904, and 906 in the garbage collection unit 908 is an atomic writing unit marked "parity." The parity atomic writing unit contains parity information for the other atomic writing unit in the same stripe as the parity atomic writing unit.

Each of the atomic writing units marked "data" in the garbage collection unit 908 may be written to individually by a storage controller, but the data in the atomic writing units may be deleted as part of an erase operation that evacuates all the atomic writing units in the garbage collection unit at the same time.

When a storage controller is writing data to the atomic writing units marked as "data" in a given stripe, the storage controller can write data to the atomic writing unit marked "parity" in parallel or in pseudo-parallel to writing to the other atomic writing units marked "data." It is therefore possible to write data to some of the atomic writing units in a stripe of a garbage collection unit while accumulating parity data for the written atomic writing units in memory. Later, when the storage controller is ready to write data to the remaining atomic writing units in a row of a garbage collection unit, the storage controller can write the remainder of the parity data for that stripe in the parity atomic writing unit.

Another characteristic of the atomic writing units in the garbage collection unit 908 is that each atomic writing unit contains its own LBA marker. As such, each atomic writing unit includes information regarding the LBAs represented by the data in the atomic writing unit. In contrast to other data packets disclosed herein, data packets on a NAND Hash storage tier need not include directory information because that information is included in the individual atomic writing unit themselves. Writing packetized data on a NAND Flash storage tier therefore breaks the notion that a data packet lines up with an allocation unit. In other words, a data packet such as a coarse data packet may span multiple stripes in a garbage collection unit.

In the example of a NAND Flash storage tier, an example set of packetized data is illustrated with reference to erasure block 910. Erasure block 910 includes three rows of data 918, 920, and 922. Under an example workload, the storage controller writes a first fine data packet 912 in the first page of row 918. Then the storage controller writes two more fine data packets in the next two pages of row 918. Now the storage controller has a need to write a coarse data packet. In the present example, a coarse data packet has been chosen to comprise 10 pages of data. There are not 10 free pages remaining in the row 918, but that does not pose a problem because the coarse data packet may span multiple rows. In the present example, the storage controller writes the first two pages of data of the coarse data packet 914 into the last two data pages of row 918, then writes the parity page in the last page of row 918, then continues writing the coarse data packet 914 into the next row, row 920. When the storage controller reaches the end of the row 920, the storage controller writes a parity page for the row 920 and continues writing the coarse data packet 914 into the first three pages of row 922. When the storage controller has completed writing the coarse data packet 914, it waits for the next write request from the host. The storage controller need not write the parity page in row 922 until it has received more data to write in row 922, which in the present example is a fine data packet 916 followed by another fine data packet to complete the data pages of row 922. Then the storage controller may write the parity page for row 922 and the erasure block is full.

In one implementation, a limitation of a NAND Flash storage media organized into dual granularity allocation units for packetized storage is that a coarse data packet may not span multiple erasure blocks. If a storage controller receives data comprising a coarse data packet, but there is not a sufficient number of pages remaining in the current erasure block to accommodate the full coarse data packet, then the storage controller may fill the remaining pages of the erasure block with extra parity data, fill data, or other valid data. Then the coarse data packet may be written contiguously into the next erasure block. In another implementation, coarse data packets may span erasure blocks, but spanning erasure blocks adds cost to the data storage device because it will increase the size of the mapping tables to track the locations of the coarse data packet.

In another implementation, the storage controller is receiving sequential write data from the host, but the storage controller is not aware how much sequential data the host will eventually send. In this scenario, the storage controller may begin by writing the data as fine data packets as the write data is received from the host. This approach may be advisable if a coarse data packet is too large to fit into the volatile memory on the storage device or if the host requests acknowledgement that a fine packet of data has been written before sending the next packet, such as with a flush command. The storage controller may identify, after writing a number of sequential fine data packets, that the fine data packets as a whole constitute a coarse data packet. This case can be handled by a fine-to-coarse promotion operation that constitutes a change to the mapping tables to view the fine data packets as a single coarse data packet. Such a fine-to-coarse promotion operation causes entries in the forward map to be returned to the free pool, thus reducing the memory requirement for mapping the written data.

Other promotion operations analogous to the promotion operations disclosed herein are available on NAND Flash data storage media. For example, pages in an erasure block may become stale when they are superseded by other data, such as random write data received from a host. A fine-to-fine promotion operation is available wherein a storage controller reads a first erasure block of fine data packets, writes any valid fine data packets to the pages in another erasure block, and evacuates the first erasure block. A fine+coarse-to-coarse or a fine+coarse-to-fine+coarse promotion operation on NAND Hash storage media is available when a storage controller reads an erasure block including both fine and coarse data packets that include a mix of valid and stale data. The storage controller may then write the valid data into another erasure block, which may include both fine and coarse data packets. The promotion operations of packetized data on a NAND Flash storage media are more flexible than on other types of storage media (e.g., SMR storage media) because the data packets need not align with allocation units.

Figure 10:
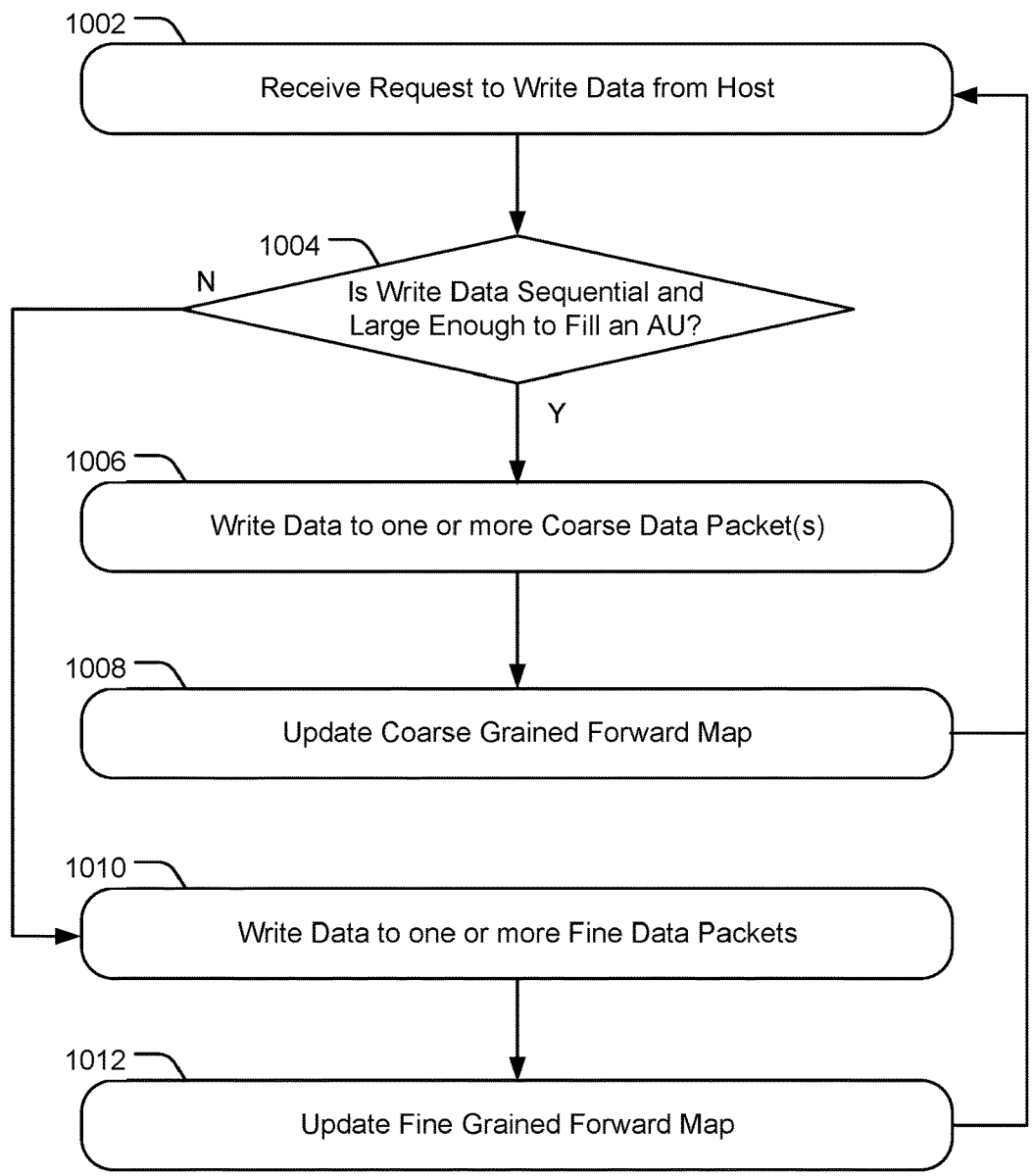
FIG. 10 illustrates example operations for handling host write requests in a data storage device equipped with data store organized into dual granularity allocation units for packetized storage.

FIG. 10 illustrates example operations 1000 for handling host write requests in a data storage device equipped with data store organized into dual granularity allocation units for packetized storage. A receiving operation 1002 receives a request to write data from a host. The write data may comprise sequential data, random write data, and/or a combination thereof. A decision operation 1004 is whether the received write data is sequential and large enough to fill a coarse data packet. If the write data is sequential and large enough to fill a coarse data packet, then a write operation 1006 writes the received data to one or more coarse data packets in allocation units on the storage media. An updating operation 1008 then updates a coarse-grained forward map to reflect that the LBA range(s) of the write data is stored in the allocation units in which the storage controller wrote the data in the writing operation 1006.

If the decision operation 1004 determines that the write data is not sequential and large enough to fill an allocation unit, then the operations 1000 proceed to write operation 1010, which writes the data to one or more fine data packets in one or more allocation units on the storage media. An updating operation 1012 then updates one or more fine-grained forward maps to reflect the PBAs of the data written in the writing operation 1010.

The implementations described herein are implemented as logical operations in one or more computer systems. The logical operations may be implemented (1) as a sequence of processor-implemented operations executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A data storage device comprising:
a storage tier being organized into a plurality of allocation units, each allocation unit in the plurality of allocation units representing a range of physical addresses on the storage tier configured to be written sequentially with a single packet of data; and a coarse-grained forward map having one or more coarse-grained forward map entries, each of the coarse-grained forward map entries identifying a physical address range of an allocation unit on the storage tier and each coarse-grained forward map entry further including a fine-grained forward map including one or more fine-grained forward map entries, each fine-grained forward map entry identifying at least a physical block address of one or more superseding physical blocks outside the allocation unit superseding one or more superseded physical blocks inside the allocation unit, each fine-grained forward map entry further identifying a logical block address corresponding to the one or more superseded physical blocks.

2. The data storage device claim 1, wherein the fine-grained map is a linked list and wherein each of the fine-grained map entries is an element of the linked list.

3. The data storage device claim 1, wherein the logical block address corresponding to the one or more superseded physical blocks in each fine-grained forward map entry is a logical block address offset from a beginning of the of the allocation unit.

4. The data storage device claim 1, wherein the fine-grained map is a binary tree and wherein each of the fine-grained map entries is a node of the binary tree.

5. The data storage device claim 1, further comprising:
a storage controller configured to receive requests from a host device to store host data in the allocation unit; and
an entry in the coarse-grained forward map corresponding to the allocation unit further including a range of logical addresses of the compressed host data.

6. The data storage device claim 1, wherein the storage controller further configured to compress the host data before storing the compressed host data in the allocation unit.

7. The data storage device claim 1, further comprising:
a storage controller configured to receive a request from a host device to store host data having a range of logical addresses on the storage tier, the storage controller further configured to dynamically assign the range of logical address to one of the plurality of allocation units.

8. The data storage device claim 1, wherein each allocation unit in the plurality of allocation units represents a range of physical addresses of equal size.

9. A method comprising:
organizing a storage tier into a plurality of allocation units, each allocation unit in the plurality of allocation units representing a range of physical addresses on the storage tier configured to be written sequentially with a single packet of data;
receiving first write data from a host, the first write data being logically located in a range of logical block addresses;
writing the first write data to the data storage media in a first allocation unit of the plurality of allocation units;
updating an entry of a coarse-grained forward map to reflect a physical location of the first write data in the first allocation unit;
receiving second write data from the host, the second write data being logically located within the range of logical block addresses;
writing the second write data to the storage tier in a second allocation unit of the plurality of allocation units, the second allocation unit being different than the first allocation unit; and
updating the entry of the coarse-grained forward map to include a fine-grained forward map, the fine-grained forward map reflecting the physical location of the second write data in the second allocation unit.

10. The method of claim 9, wherein the first write data is written to the first allocation unit on the storage tier in a coarse data packet.

11. The method of claim 9, wherein the first write data is written to the first allocation unit on the storage tier in a fine data packet.

12. The method of claim 10, wherein the coarse data packet includes directory information, a single data extent payload, and parity data.

13. The method of claim 11, wherein the fine data packet includes directory information, a payload of multiple data extents, and parity data.

14. The method of claim 13, wherein the fine data packet further includes fill data, the fill data being sized such that a size of the fine data packet in physical address space equals a size of one of the plurality of allocation units in physical address space, the fill data further including a predetermined data pattern.

15. The method of claim 9, wherein a size of a coarse data packet is of equal size in physical address space as each of the allocation units in the plurality of allocation units.

16. A method comprising:
selecting, out of a plurality of allocation units wherein each allocation unit represents a range of physical addresses on a storage tier, a first allocation unit, the first allocation unit storing a first data packet containing at least host data having one or more ranges of logical block addresses;
reading the host data stored in the first data packet;
identifying one or more subsets of superseded data in the host data stored in the first data packet;
locating one or more superseding data packets stored in others of the plurality of allocation units, the one or more superseding data packets superseding the one or more subsets of superseded data in the host data stored in the first data packet;
selecting, out of the plurality of allocation units, one or more free allocation units; and
writing valid data from a set of data into the one or more free allocation units, the set of data including the host data stored in the first data packet and the superseding data.

17. The method of claim 16, further comprising:
evacuating the first allocation unit.

18. The method of claim 16, wherein:
the first data packet is a coarse data packet;
the one or more data packets stored in the others of the plurality of allocation units are fine data packets; and
the writing operation writes at least one coarse data packet to the one or more free allocation units.

19. The method of claim 16, wherein:
the first data packet is a fine data packet;
the one or more data packets stored in the others of the plurality of allocation units are fine data packets; and
the writing operation writes at least one coarse data packet to the one or more free allocation units.

20. The method of claim 16, wherein:
the operation selecting the first allocation unit further includes selecting the first allocation unit that occupies a range of physical addresses belonging to a band of tracks on the data storage media;

selecting one or more additional allocation units, the one or more additional allocation units belonging to the band of tracks and storing additional host data;

the identifying operation further includes identifying one or more subsets of superseded data in the additional host data;

the operation selecting one or more free allocation units includes selecting all allocation units belonging to a second band of tracks on the data storage media; and the writing operation includes writing valid data from the set of valid data into the first allocation unit and the additional allocation units, the set of valid data further including the additional host data.

21. The method of claim 16, wherein the operation selecting the first allocation unit is based in part on a fragmentation level of the first allocation unit in comparison to other allocation units on the storage tier.

* * * * *